Aug. 27, 1968  W. D. BROWN  3,398,471
TRENCHER BOOM AND AUGER MOUNT
Filed March 4, 1965  2 Sheets-Sheet 1

INVENTOR.
William Delbert Brown
BY
Hofgren, Wegner,
Allen, Stellman & McCord,
Attys

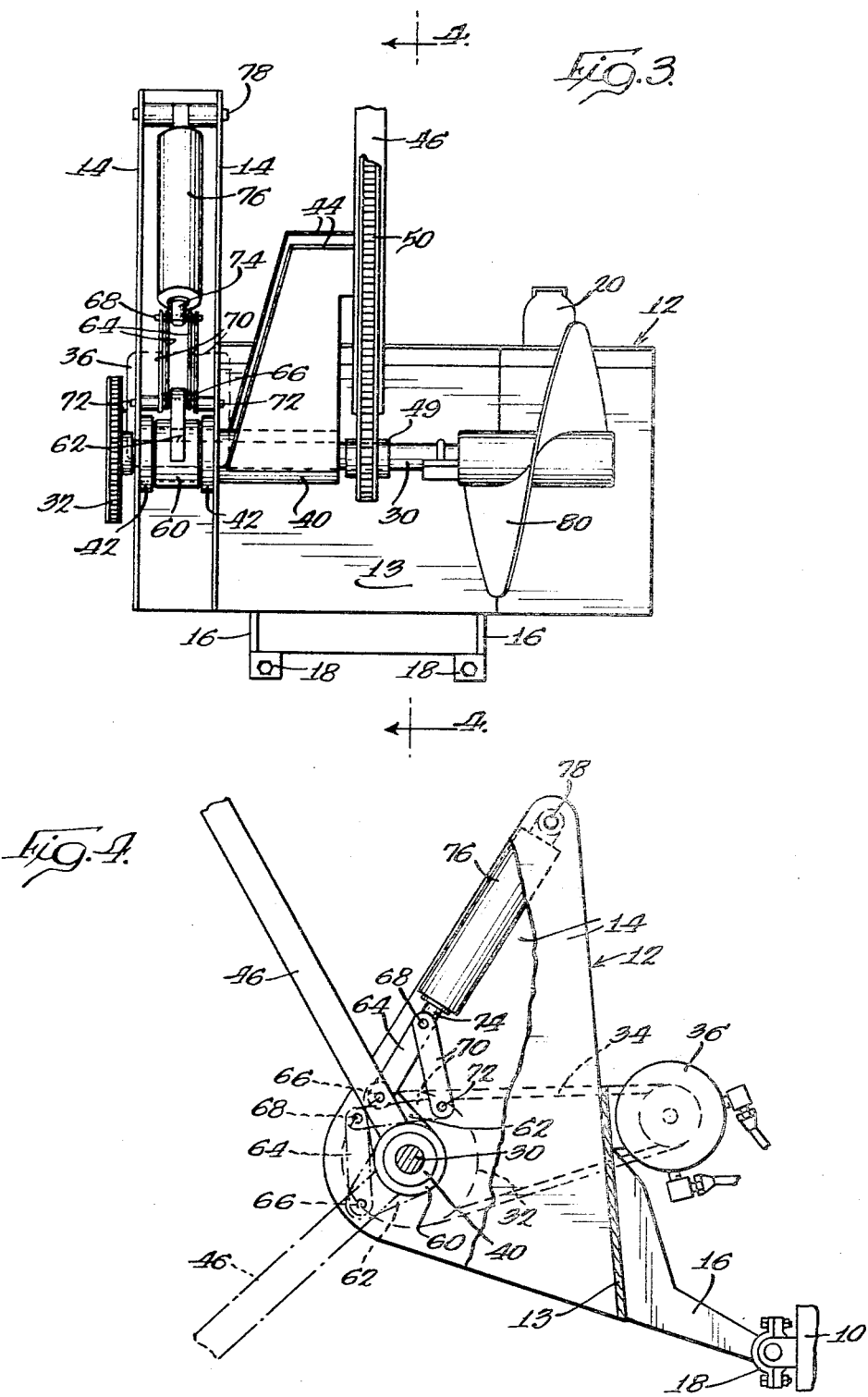

United States Patent Office 3,398,471
Patented Aug. 27, 1968

3,398,471
TRENCHER BOOM AND AUGER MOUNT
William Delbert Brown, Woodbine, Iowa, assignor to
Omsteel Industries, Inc., Omaha, Nebr.
Filed Mar. 4, 1965, Ser. No. 437,078
5 Claims. (Cl. 37—86)

ABSTRACT OF THE DISCLOSURE

A trenching device for use with vehicles including support means movably mounted on the vehicle for up and down movement relative thereto, means for adjusting the height of the support means relative to the vehicle, a boom pivotally mounted on the support means and including cutting means thereon for digging a trench, means for adjusting the position of the boom with respect to the support means and means on the support means for moving material away from the cutting means.

Background of the invention

Trenching devices presently available on the market generally have proved to be a great success with contractors or the like in digging trenches for electrical conduits, gas and water conduits, drain fields and in some cases have even been used to dig trenches to contain the footings for foundations of small buildings. Accordingly, the flexibility of a trenching machine is a major factor in determining its ultimate utility to its owner and/or operator. While presently available trenching machines have proved generally satisfactory in their performance, it has been apparent to those skilled in the art that a machine with additional versatility would be extremely desirable. The currently available machines have a typical construction including a trenching boom, having an endless cutting chain thereon, which is pivotally mounted to a vehicle. Customarily, means, such as an auger, are mounted on the boom adjacent the pivotally mounted end for clearing away material elevated by the cutter chain. With such a construction, the position of the clearing means is completely dependent upon the boom angle in relation to the vehicle. Accordingly, the height of the mound of excavated material made by the clearing means along the length of the trench cannot be regulated while cutting a trench of a desired depth. Furthermore, several known constructions are such that even with the trenching boom elevated to a traveling or non-trenching position, the clearing means are in extremely close proximity to the ground, thus giving rise to the substantial possibility of damage to the clearing means by interference with the ground while the vehicle mounting the trenching boom is in transit.

Summary of the invention

The principal object of the invention is to provide a new and improved trenching device overcoming these shortcomings of prior art devices.

Another object of the invention is to provide a new and more versatile trenching attachment for existing tractors and other vehicles.

More specifically, it is an object of the invention to provide in a trenching device support means mounting a clearing auger and a pivotal trenching boom, wherein the support means are mounted on the vehicle in a manner facilitating up and down movement, whereby the boom angle and the height of the auger above the ground can be adjusted generally independently of each other.

Another object of the invention is the provision in a trenching device of a drive shaft journaled in a support means for driving a clearing auger and a cutter chain, and which pivotally mounts a trenching boom.

Another object of the invention is the provision in a trenching machine of reciprocal power means mounted on a support means for manipulating a trenching boom wherein a novel linkage between the power means and the trenching boom precludes improper movement of the trenching boom.

Other objects and advantages of the invention will become apparent from the following specification and drawings.

Description of the drawings

FIGURE 3 is a rear view of a trenching device according to the invention; and

FIGURE 4 is a view of mechanism for operating a trenching boom according to the invention, taken approximately along the line 4—4 of FIGURE 3, with the cutting means removed and a portion broken away.

Detailed description

Figure 1:
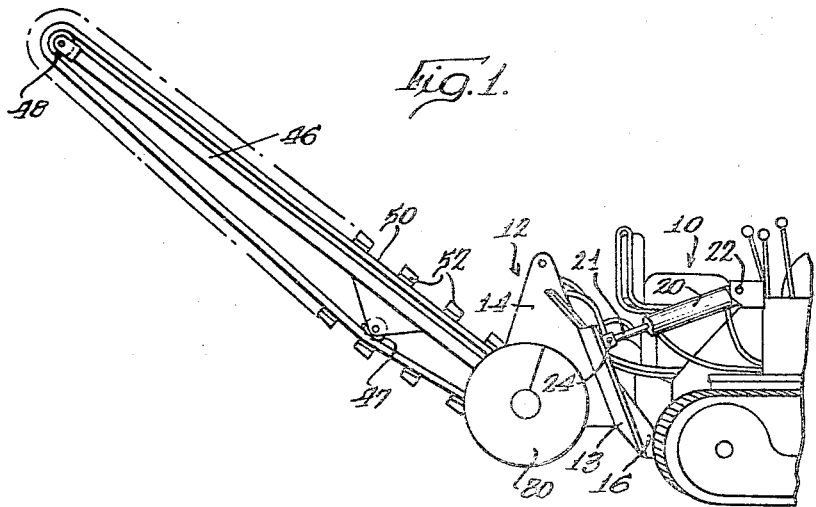
FIGURE 1 is a schematic view of a trenching device, according to the invention, mounted on a tractor.

An exemplary form of the invention is mounted on a tractor generally designated as 10 as shown in FIGURE 1. A support means, generally designated 12, serves as a mount for the various components and comprises a back plate 13 which is of a suitable size and shape so as to shield the tractor and its operator from the material being elevated by the cutter chain during operation of the trencher. Mounted on the back plate 13, at one end thereof and at right angles thereto, is a pair of forwardly projecting, spaced plates 14 (see FIGURES 3 and 4), which house a mechanism for controlling the elevation of the trenching boom. The back plate 13 is mounted on the tractor 10 by means of a pair of rearwardly extending arms 16 depending from the back plate 13, and connected by a pair of pivots 18, one on each arm 16, to the tractor 10.

To accomplish generally up and down movement of the support means 12 relative to the tractor 10, there are provided power means in the form of a hydraulic cylinder 20 having a piston rod 21. One end of the cylinder 20 is provided with a suitable pivotal connection 22 to the tractor 10. The piston rod 21 of the cylinder 20 is connected to the support means 12 by a pivotal connection 24. By selective actuation of the hydraulic cylinder 20, the support means 12 may be moved to a variety of positions relative to the tractor 10, the extreme positions of such movement being shown by the solid and dotted line positions of the support means 12 in FIGURE 2.

A drive shaft 30 is supported by the spaced plates 14 by means to be described hereafter and has on one end the drive sprocket 32. The drive sprocket 32 is driven by a suitable chain 34 which in turn is driven by a hydraulic motor 36 mounted on the back plate 13. It is to be understood that the use of a hydraulic motor is a matter of convenience when a trenching device according to the invention is used on a vehicle having a hydraulic system such as a typical tractor, and that any suitable motor means, such as an electric motor or an internal combustion engine could be used in place of such a hydraulic motor.

The drive shaft 32 is journaled within a sleeve 40 which, in turn, is journaled within the spaced plates 14 by a pair of suitable bearings 42, one bearing 42 being mounted on each of the plates 14, as shown in FIGURE 3. Secured to the sleeve 40 by means of welding or the like, is a pair of braces 44 which in turn support a trenching boom 46. A first idler sprocket 47 is mounted intermediate the ends of the trenching boom 46 while the second idler sprocket 48 is mounted at the end of the trenching boom 46 remote from the tractor 10. A drive sprocket 49, the hub of which may be seen in FIGURE 3, is mounted on the drive shaft 30 in line with the longitudinal axis of the trenching boom 46. An endless cutter chain 50 having digging cleats 52 mounted thereon, and which may be of conventional construction, is supported for movement about the trenching boom 46 by the first and second idler sprockets 47 and 48, respectively, and is in driving engagement with the drive sprocket 49 on the drive shaft 30.

Between the spaced plates 14 and about the sleeve 40, is a second sleeve 60 rigidly connected to the sleeve 40. An apertured lug 62 is secured to the sleeve 60. A pair of links 64 (see FIGS. 3 and 4) has, at one end, a pivot pin 66 which is received within the aperture of the lug 62 to form a pivotal connection therewith. At the other end of the pair of links 64 is a suitable pivotal connection 68 to a piston rod 74 of a hydraulic cylinder 76. A second pair of links 70 has at one end pivotal connections 72 with each of the spaced plates 14. The other end of the links 70 shares the pivotal connection 68 to the piston rod 74 with the pair of links 64. The hydraulic cylinder 76 is suitably connected by a pivot 78 to the support means 12 and serves as a power operated positioning means for the trencher boom 46 which may be moved thereby through a variety of positions, including an elevated position and several digging positions, the extremes of which are shown in the solid and dotted lines of FIGURE 4. The links 64 serve as a flexible connection between the cylinder piston 74 and the lug 62 to transmit force to the latter, and thus rotate the trenching boom 46, as the sleeve 60 and lug 62 rotate relative to the support means 12, while the links 70 serve to cause the piston rod 74, as it is extended by the cylinder 76, to rotate slightly about the pivot 78 in a direction away from the drive shaft 30 and sleeve 40 to preclude interference therebetween and to insure that the flexible connection to the lug 62 produced by the links 64 will not flex in the wrong direction, thereby insuring proper movement and control of the boom 46.

Figure 2:
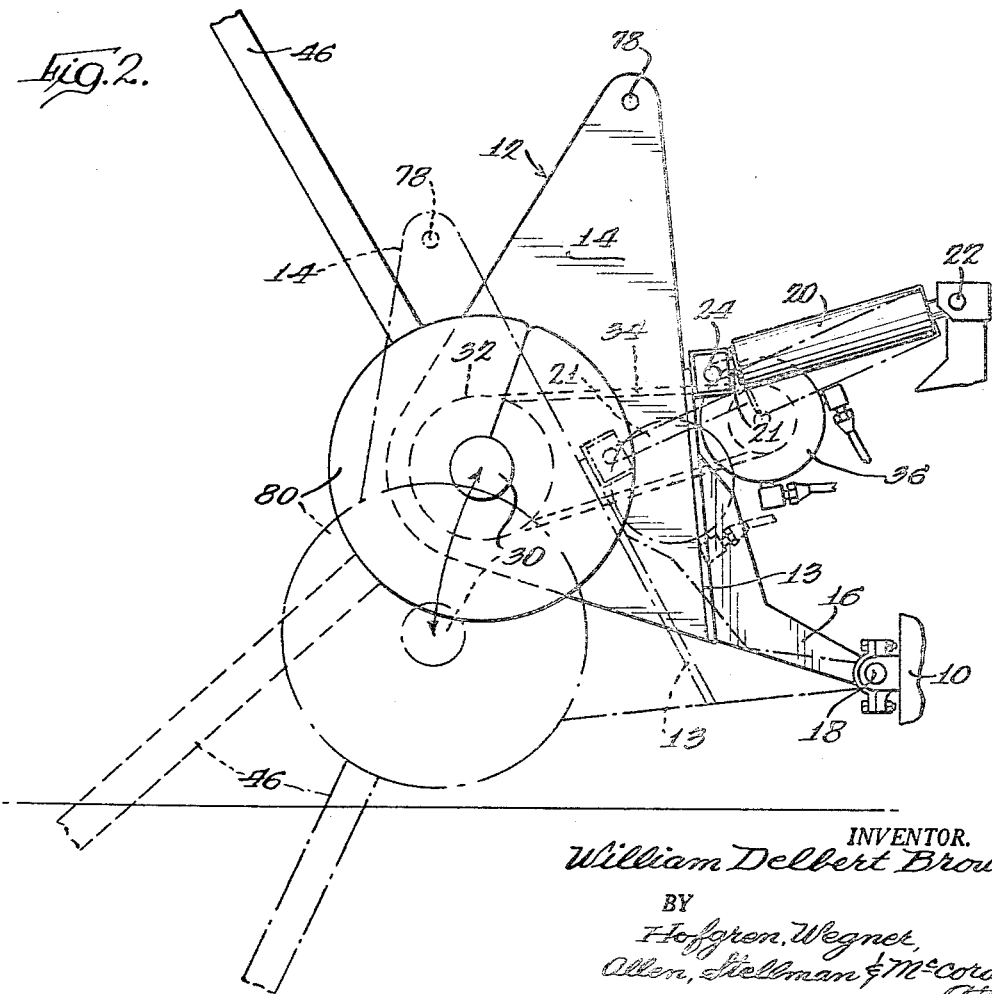
FIGURE 2 is a side view of the mounting of a trenching device according to the invention on a vehicle.

On the end of the drive shaft 30 remote from the drive sprocket 32, is mounted an auger 80 having its flights arranged such that upon operation of the cutter chain 50, dirt or the like elevated by the cutter chain 50 will be pushed away from the chain 50 and to one side of the trenching device. By virtue of the mounting of the auger 80 on the movable support means 12, it will be appreciated that by proper adjustment of the support means 12 through selective activation of the hydraulic cylinder 20, the height of the auger 80 above the ground may be regulated substantially independently of the angle of the trenching boom 46 with respect to the tractor 10, the latter in turn being independently regulated by selective actuation of the hydraulic cylinder 76. This feature, which is shown in FIGURE 2 by the two dotted line positions of the boom 46 in relation to the solid and dotted line positions of the auger 80, permits the height of the mound of elevated dirt running along the side of the trench being dug to be regulated to any desired degree. Furthermore, when the trenching device is not being used, and the tractor 10 is being moved from one location to another, the auger 80 can be elevated to its uppermost position and will not suffer damaging contact with the ground or other surroundings during transit.

Thus, it will be apparent that the "double jointed" construction of a trenching device in accordance with the invention provides great flexibility and is particularly suited for terrain having abrupt changes in elevation, and is therefore readily adaptable to the varying conditions encountered from job to job.

Having disclosed a specific embodiment of my invention as required by 35 U.S.C. 112, I do not wish to be limited to the specific details set forth, but rather, to have the invention construed according to its true spirit as set forth in the following claims.

I claim:
1. A trenching apparatus comprising:
 (a) a vehicle having a body;
 (b) rigid support means;
 (c) a first pivot connecting said support means fixedly to said body;
 (d) a single, elongated, rigid boom;
 (e) a second pivot connecting said boom to said support means, said second pivot being spaced from said first pivot;
 (f) a cutting chain mounted on said boom;
 (g) clearing conveyor means mounted on said support means for moving excavated material away from said boom, at least a portion of said conveyor means adapted to be located in close proximity to the level of the terrain on which the vehicle may travel;
 (h) motor means mounted on said support means and movable therewith;
 (i) means on said support means interconnecting said motor means and said cutting chain and said conveyor means whereby said motor means may drive said cutting chain and said conveyor means;
 (j) first reciprocal means interconnecting said support means and said boom for pivoting said boom on said support means;
 (k) second reciprocal means, including a first member pivotally connected to said support means at a location spaced from said first pivot and a second member pivotally connected to said body, for pivoting said support means on said body;
 (l) whereby, the position of the boom may be controlled independently of the position of the support means by said first reciprocal means; and
 (m) whereby the position of the clearing conveyor means may be controlled during operation of the apparatus substantially independently of the position of the boom by both said first and second reciprocal means.

2. A trenching apparatus according to claim 1 wherein said second pivot comprises a shaft journalled on said support means, said clearing conveyor means comprises an auger mounted on said shaft, and said interconnecting means on said support means comprises a sprocket fixed to said shaft and in driving engagement with said cutting chain.

3. A trenching apparatus according to claim 1 wherein said support means comprises a back plate for shielding said vehicle body having a pair of arms extending toward said vehicle body, said first pivot being located at the extremity of said arms, and forwardly projecting means mounting said second pivot.

4. A trenching apparatus according to claim 1 wherein said support means comprise a pair of forwardly extending spaced plates, said second pivot comprising a shaft passing through said plates, a sleeve journalled on said shaft and connected to said boom, said first reciprocal means comprising a hydraulic cylinder located between said plates and having one end secured thereto, the other end of said cylinder being secured to a lug connected to said sleeve.

5. A trenching apparatus according to claim 1 wherein said support means comprises a back plate shielding said vehicle body, a pair of rearwardly extending arms having said first pivot at their extremities and being secured to said back plate, and a pair of spaced, forwardly extending, spaced plates; and wherein said second pivot comprises a shaft journalled in said forwardly extending plates; said clearing conveyor means comprising an auger mounted on said shaft; said first reciprocal means comprising a hydraulic cylinder nested between said forwardly extending plates; and said interconnecting means on said support means comprising a sprocket secured to said shaft and drivingly engaging said chain together with a drive means extending between said motor means and said shaft.

References Cited

UNITED STATES PATENTS

| | | | |
|---|---|---|---|
| 2,997,276 | 8/1961 | Davis | 37—86 X |
| 3,098,395 | 7/1963 | Haganes | 74—105 |
| 3,130,506 | 4/1964 | Laster | 37—86 |
| 3,309,802 | 3/1967 | Baker | 37—191 |
| 3,263,515 | 8/1966 | Adamski | 74—105 |
| 3,043,029 | 7/1962 | Allard | 37—86 |
| 3,206,876 | 9/1965 | Penote et al. | 37—86 |
| 3,209,473 | 10/1965 | Davis | 37—86 |

ABRAHAM G. STONE, *Primary Examiner.*

A. E. KOPECKI, *Assistant Examiner.*